United States Patent
Skoglund

(10) Patent No.: US 12,311,715 B2
(45) Date of Patent: May 27, 2025

(54) SUSPENSION ARRANGEMENT FOR A VEHICLE

(71) Applicant: VOLVO TRUCK CORPORATION, Gothenburg (SE)

(72) Inventor: Alfred Skoglund, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 415 days.

(21) Appl. No.: 17/929,498

(22) Filed: Sep. 2, 2022

(65) Prior Publication Data

US 2023/0084040 A1    Mar. 16, 2023

(30) Foreign Application Priority Data

Sep. 10, 2021  (EP) .................................. 21196004

(51) Int. Cl.
*B60G 11/27*    (2006.01)
*B60G 11/28*    (2006.01)

(52) U.S. Cl.
CPC .............. *B60G 11/27* (2013.01); *B60G 11/28* (2013.01); *B60G 2202/152* (2013.01); *B60G 2204/111* (2013.01); *B60G 2300/02* (2013.01); *B60G 2600/042* (2013.01)

(58) Field of Classification Search
CPC .. B60G 11/27; B60G 11/28; B60G 2202/152; B60G 2204/111; B60G 2300/02; B60G 2600/042
See application file for complete search history.

(56) References Cited

U.S. PATENT DOCUMENTS

| | | | |
|---|---|---|---|
| 5,337,137 A | 8/1994 | Ogawa et al. | |
| 2022/0268913 A1* | 8/2022 | Nordmeyer | G01S 13/32 |

FOREIGN PATENT DOCUMENTS

| | | | |
|---|---|---|---|
| CN | 103620256 A | 3/2014 | |
| CN | 110612221 A | 12/2019 | |
| CN | 211195758 U | 8/2020 | |
| DE | 102011107970 A1 * | 1/2013 | ............. B60G 11/27 |
| DE | 102019201521 A1 | 8/2020 | |
| EP | 0938999 A2 | 9/1999 | |
| EP | 3640497 A1 | 4/2020 | |

(Continued)

OTHER PUBLICATIONS

Extended European Search Report in corresponding European Application No. 21196004.2 dated Feb. 15, 2022 (8 pages).

(Continued)

*Primary Examiner* — Faye M Fleming
(74) *Attorney, Agent, or Firm* — Venable LLP; Jeffri A. Kaminski

(57) ABSTRACT

A suspension arrangement for a vehicle includes a piston for supporting a flexible bellows assembly of the suspension arrangement, said piston having a first portion connectable to the flexible bellows assembly and a second portion connectable to a wheel axle, said piston further having an outer side and an inner side, and wherein said suspension arrangement further comprises a mounting structure for positioning an insertable sensor device toward the flexible bellows assembly, said mounting structure extending at least from the outer side to the inner side and having an outer opening for receiving the insertable sensor device from an outside of the piston.

13 Claims, 6 Drawing Sheets

(56) References Cited

FOREIGN PATENT DOCUMENTS

| EP | 3715155 A1 | 9/2020 | | |
|----|----|----|----|----|
| WO | WO-2007017022 A1 | * | 2/2007 | ............. B60G 11/27 |
| WO | 2007137647 A1 | | 12/2007 | |
| WO | 2021011594 A1 | | 1/2021 | |

OTHER PUBLICATIONS

Chinese Office Action dated Mar. 25, 2025 in corresponding Chinese Patent Application No. 202211038841.2, 16 pages.

* cited by examiner

SUSPENSION ARRANGEMENT FOR A VEHICLE

TECHNICAL FIELD

The present disclosure relates to a suspension arrangement for a vehicle. The disclosure also relates to a vehicle comprising such suspension arrangement. The disclosure is applicable on vehicles, in particularly low, medium and heavy-duty vehicles commonly referred to as trucks. Although the disclosure will mainly be described in relation to a truck, it may also be applicable for other type of vehicles having suspension arrangements comprising flexible bellows, such as cars, working machines within the fields of industrial construction machines or construction equipment, such as articulated haulers, dump trucks, wheel loaders and the like.

BACKGROUND

In connection to low-, medium and heavy-duty vehicles, also commonly referred to as trucks, air suspension arrangements are commonly mounted between the wheel axle and the vehicle chassis in order to absorb the vibrations caused by, for example, the road surface at which the vehicle is driving. A typical air suspension arrangement comprises a flexible bellows, or flex member, which is connected to the vehicle chassis, and a piston which is connected to the wheel axle. The chassis can be raised and lowered in relation to the wheel axle by means of inflating or deflating air into the space formed by the flexible bellows. The flexible bellows is thus arranged to roll up and down on the piston when inflating/deflating air therein. Such arrangements may also collectively be referred to as an air spring arrangement.

During operation of the air suspension arrangement, i.e. when driving the vehicle, there is generally a need for monitoring the operation and functionality of the air suspension arrangement. By way of example, the suspension arrangement may include a so-called level sensor arranged to control the air suspension. Such sensor may also be used to monitor degradation or aging of the components making up the arrangement. In this context, an aged suspension arrangement may generally not provide the same suspension characteristics as a new and unused air suspension arrangement. One main reason for the aging of the air suspension arrangement is that the flexible bellows will degrade over time. When the flexible bellows has been degraded to a certain extent, it must be replaced by a new one for providing sufficient suspension to the vehicle.

While there are a number of different ways to monitor and control the air suspension arrangement by one or more sensor devices of different types, there is still a need for an improved vehicle suspension arrangement allowing an efficient control of the air suspension. Further, there is a desire in the field of suspension arrangement for facilitating the positioning and assembly of a sensor device used for the control of the air suspension.

SUMMARY

It is an object of the present disclosure to provide an improved suspension arrangement, which allows for an easy positioning of a sensor device inside a piston of the suspension arrangement. The object is at least partly achieved by a suspension arrangement. The objective is also achieved by the other independent claims. The dependent claims are directed to advantageous embodiments of the disclosure.

According to a first aspect of the present disclosure, there is provided a suspension arrangement for a vehicle. The suspension arrangement comprises a piston for supporting a flexible bellows assembly of the suspension arrangement. The piston has an outer side and an inner side. The piston further has a first portion connectable to the flexible bellows assembly and a second portion connectable to a wheel axle. Moreover, the suspension arrangement comprises a mounting structure for positioning a sensor device toward the flexible bellows assembly. The mounting structure extends at least from the outer side to the inner side and having an outer opening for receiving the sensor device from an outside of the piston.

One advantage with the proposed suspension arrangement is to facilitate the positioning of a detachable sensor device, such as a level indicator device, in a piston of a vehicle suspension arrangement. In addition, the proposed suspension arrangement contributes to an improved assembly of the sensor device in the suspension arrangement. This is at least partly provided by the arrangement of the mounting structure extending at least from the outer side to the inner side, wherein the mounting structure provides an opening for receiving the insertable sensor device from the outside of the piston. As will be further described herein, the mounting structure can be arranged and/or attached to the piston in several different ways. In addition, as will be further described herein, the sensor device can be positioned and fixated in a number of ways to the mounting structure.

Accordingly, the proposed suspension arrangement is not only adapted to provide an improved positioning of a sensor device, but also adapted to permit an easy removal of the sensor device from the piston. In this manner, the proposed suspension arrangement also contributes to a user-friendly and intuitive assembly and disassembly of the sensor device from the suspension arrangement, in particular from the piston, without compromising the functionality of the flexible bellows and its connection to the piston.

In addition, it is also believed that the sensor device can be arranged in or to the piston in a relatively fool proof manner by the arrangement of the mounting structure and the opening at the outside of the piston. The proposed suspension arrangement may also contribute to improved ergonomics for the service personnel and a quicker change of an erroneous sensor device, partly as the sensor device can be easily removed by hand from the outside of the piston. In this context, it may be noted that service of vehicle suspension arrangements is generally carried out vertically below the suspension arrangement, and thus from the outer bottom side of the piston. Hence, it may be particularly beneficial to use the proposed arrangement of the mounting structure and sensor device in such suspension arrangement. Further, the proposed mounting structure may allow for increased space for various cable routing inside the piston and the flexible bellows.

By having the mounting structure extending from the outer side to the inner side of the piston, the mounting structure is configured to position the sensor device inside an inner volume of the piston. In other words, the mounting structure is arranged on or at the piston, extending from the outer side to the inner side of the piston, such that the sensor device can be positioned inside the inner volume of the piston and directed toward the flexible bellows assembly.

The mounting structure may generally be arranged to the second portion of the piston or be an integral part of the second portion of the piston. By way of example, the mounting structure is arranged to a bottom surface of the second portion of the piston.

The mounting structure may be configured to arrange the accommodated sensor device in an angled orientation relative to the bottom surface of the second portion of the piston. Such arrangement of the mounting structure with an angled sensor device positioning further facilitates the accessibility and service of the sensor. Favorably, the mounting structure may also be arranged offset an axial center of the bottom surface of the piston. In this manner, it becomes possible to e.g. determine a distance or any other parament within the piston without interfering with a piston center bolt, which provides attachment of the piston to the wheel(s)), while still providing a centered sensor position.

However, the mounting structure may necessarily not be arranged offset the axial center of the piston. In some embodiments, the mounting structure may be configured to arrange the accommodated sensor device in the angled orientation relative to the bottom surface of the second portion of the piston, wherein the mounting structure is arranged and/or extend from the axial center of the bottom surface of the piston. Such arrangement of the mounting structure at the axial center of the bottom surface of the piston is suitable for pistons where there is no piston center bolt, but another type of attachment of the piston to the wheel.

The mounting structure may be a hollow housing for accommodating the sensor device. The housing may have an inner circumferential side wall inclined in relation to the bottom surface.

The mounting structure may be configured to arrange the sensor device in an angled orientation relative to the bottom surface by an angle of between 5 to 85 degrees. This range may provide a particular advantageous arrangement of the sensor device in the piston.

The mounting structure may be configured to arrange the accommodated sensor device in a perpendicular orientation relative to a bottom surface of the of the second portion of the piston. In this manner, there is provided a simple, yet efficient way of arranging the sensor device into the piston.

The mounting structure may be arranged offset a center of the inner bottom surface of the piston. One advantage with this arrangement is that the level indicator device position is improved in terms of its position in relation to the centre axial attachment of the piston to the wheel/axle.

Typically, the mounting structure may be an integral part of the piston. By way of example, the mounting structure is molded into the piston. The piston can be provided in several different materials. By way of example, the piston is made in a composite material.

Alternatively, or in addition, the mounting structure may be a separate part. Accordingly, the mounting structure is a separate part of the suspension arrangement. Hence, the mounting structure may thus be a separate component from the piston that is attached to a portion of the piston, as further described in the following. Moreover, a part of the mounting structure may be arranged on any one of the inner side and outer side of the piston. By way of example, a part of the mounting structure is attached to an inner bottom surface of the piston. In another example, a part of the mounting structure is attached to the outer bottom side. It may also be possible that a first part of the mounting structure is attached to the inner bottom surface of the piston and a second part of the mounting structure is attached to the outer bottom surface of the piston.

In examples when the mounting structure is a separate part attached to the piston, the piston may generally comprise a corresponding hole in the bottom surface for accommodating the mounting structure. The hole is dimensioned to the dimension of the mounting structure. In this arrangement, the mounting structure is attached to the piston in a suitable manner, as described herein.

The mounting structure can be made in a number of different materials. By way of example, the mounting structure is made of a metal or a composite material.

It should be readily appreciated that the sensor device can be positioned in or to the mounting structure in a number of different ways. Typically, the level indicator device may be detachably arranged to the mounting structure. In this manner, it may become more convenient to perform maintenance work of the suspension arrangement and its components.

In one example embodiment, the mounting structure comprises a rotational lock component for engaging with a corresponding rotational lock component of the sensor device so as to form a rotational lock configuration.

By way of example, the mounting structure rotational lock component comprises an internal thread for engaging with a corresponding outer thread of the sensor device. Analogously, the rotational lock component of the sensor device comprises the outer thread.

Alternatively, or in addition, the mounting structure may be configured to position the sensor device by any one of a friction lock configuration, mechanical fastener lock configuration, snap lock configuration and a magnetic lock configuration. The mechanical fastener lock configuration can be provided in several different manners. By way of example, the mechanical fastener lock configuration is a conventional screw connection comprising lock bolt and a washer. A washer is a conventional machine component that is used in conjunction with a screw fastener such as a bolt and nut and that serves to distribute the load from the bolt head over an area of the sensor device so that the sensor device is held in its intended position. In other examples the mechanical fastener lock configuration comprises a retaining ring/lock ring, a lock pin or the like. As such, the mounting structure and the sensor device are engaged to each other by any one of a lock bolt arrangement, lock ring arrangement and a lock pin arrangement.

The suspension arrangement may further comprise the flexible bellows assembly for damping motions from the wheel axle. The flexible bellows assembly may at least be partially connected to the first portion of the piston and further arranged to move relative to the first portion when the suspension arrangement is exposed to an external load.

Typically, a portion of the flexible bellows assembly may be arranged in contact with the first portion of the piston.

The flexible bellows assembly may further comprise an upper plate structure for enclosing an upper portion defining an open top structure of the flexible bellows assembly, said upper plate structure comprising the inner surface.

The suspension arrangement may further comprise the sensor device in the form of a level indicator device configured to determine a distance moved by a portion of the flexible bellows assembly. The wording "portion of the flexible bellows" should be construed such that a distance moved by a certain position of the flexible bellows is determined. Preferably, the distance moved by the so-called rolling lobe of the flexible bellows is detected. The portion of the flexible bellows is thus moved during operation of the vehicle, whereby the dynamic loading corresponds to the external load exerted on the suspension arrangement. The external load may generally expose the vehicle suspension arrangement to a compression force in the axial direction of the vehicle suspension arrangement. Furthermore, a control unit may be adapted to receive data from the sensor device so as to determine the height of the suspension arrangement.

The height of the suspension arrangement may further be determined on the basis of the load on the suspension arrangement and adjusted on the basis of a desired height and/or desired height adjustment. The control unit may further be configured to control the pressure in the suspension arrangement based on the load, as is commonly known in the art. The control unit may also be adapted to receive data from the sensor device for determining reference values for a flexible bellows, and to adapt the reference value based on the specific flexible bellows. Hence, the control unit may be able to learn which reference values that are acceptable and at what limits the flexible bellows should be replaced with a new one. In one example embodiment, the control unit may be configured to receive a signal from the level indicator for determining a distance moved by a portion of the flexible bellows when the suspension arrangement is exposed to an external load.

The level indicator device may be configured to transmit a signal towards an inner surface of an upper plate structure of the flexible bellows assembly. In addition, the level indicator is in communication with the control unit for transferring data from the level indicator, whereby the control unit is configured to process the data from the level indicator by means of processing circuitry so as to determine the distance moved by a portion of the flexible bellows when the suspension arrangement is exposed to an external load.

The sensor device may not necessarily be level indicator device but can likewise be sensor device configured to determine temperature, vibrations and the like.

The first portion of the piston may generally be a first cylindrical portion and the second portion a second cylindrical portion. However, the second portion may have a geometrical shape that is different in comparison to the geometric shape of the first portion. Further, as mentioned above, the flexible bellows is at least partially connected to the first portion of the piston and arranged to move relative to the first portion when the suspension arrangement is exposed to the external load.

The second portion may take various forms and shapes. According to an example embodiment, the second portion of the piston may comprise a taper shaped surface. Other shapes are of course also conceivable, such as e.g. a concave shape, an indentation, etc. In one possible implementation, the purpose of the second portion may be to provide an area where a relatively distinct deviation in pressure within the flexible bellows can be detected.

According to an example embodiment, the flexible bellows may be exposed to an external load moving the portion to reach the second portion of the piston. In this arrangement, the level indicator device may be configured to determine the distance moved by the portion of the flexible bellows when the portion of the flexible bellows reaches the second portion of the piston.

By moving the portion of the flexible bellows, i.e. the rolling lobe to reach the second portion of the piston, the effective area of the flexible bellows may generally be significantly affected. To this end, the level indicator is arranged and configured to determine a distance moved by the portion of the flexible bellows. Hereby, the distance "traveled" by the portion of the flexible bellows can be determined in an efficient manner.

According to an example embodiment, the external load may be a compression force acting on the suspension arrangement, the compression force being determined based on the distance detected by the level indicator and a detected mass of the vehicle. Accordingly, the acceleration can be determined based on the signals received from the level indicator, and the mass can be determined/estimated for the vehicle by known means.

The flexible bellows assembly may further comprise a gaseous fluid medium inlet for supplying a gaseous fluid medium into the flexible bellow assembly. The gaseous fluid medium may be air.

The suspension arrangement may further comprise a gas pressure sensor arranged inside the flexible bellows assembly for measuring a gas pressure level within the flexible bellows assembly. According to an example embodiment, the gas pressure sensor is arranged inside the flexible bellows for measuring the gas pressure level. Hereby, the gas pressure level within the flexible bellows can be continuously measured, either during motion of the vehicle or statically when the vehicle is standing still.

According to a second aspect, there is provided a vehicle comprising a vehicle suspension arrangement according to the first aspect, wherein the suspension arrangement is arranged between a frame and a wheel axle of the vehicle.

Effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS

Figure 1:
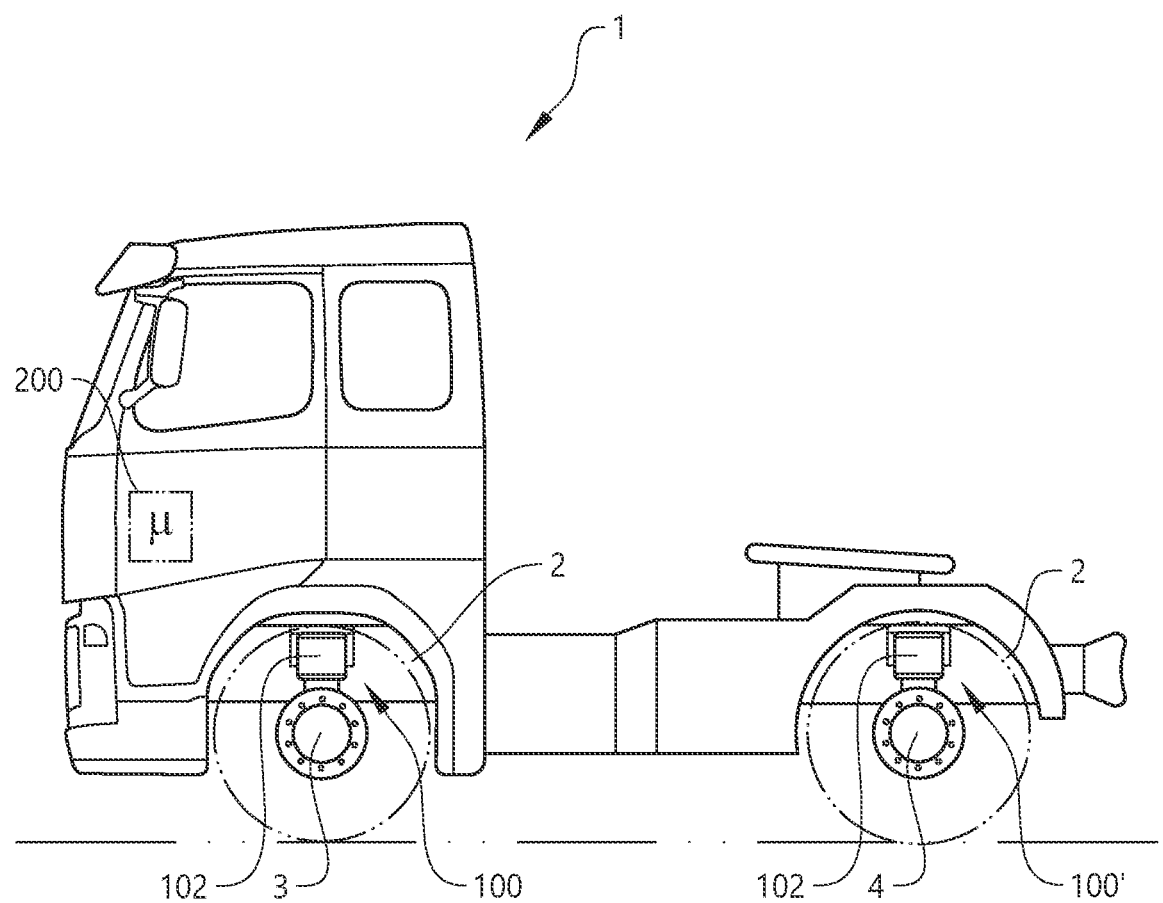
FIG. 1 is a lateral side view illustrating an example embodiment of a vehicle in the form of a truck.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 in the form of a truck for which the vehicle suspension arrangement 100 according to the disclosure is particularly suitable for. The vehicle 1 comprises a front vehicle suspension arrangement 100 connecting the frame 2 to the front wheel axle 3, and a rear vehicle suspension arrangement 100' connecting the frame 2 to the rear wheel axle 4. Hence, each of the vehicle suspension arrangement 100, 100' is arranged to damp/absorb loads from the respective wheel axles during motion of the vehicle 1. The vehicle 1 may of course comprise more than two wheel axles. As can be seen in FIG. 1, the vehicle suspension arrangement 100 comprises a flexible bellows 102 into which gas can be added or drained. Hereby, the air suspension arrangement 100 can be used for controlling the height of the frame relative to the ground level.

The vehicle 1 further comprises a control unit 200 arranged to receive control signals and deliver control signals for determining various operational parameters relating to the suspension arrangement. By way of example, the control unit 200 is arranged to receive control signals and deliver control signals for determining and control the height of the suspension arrangement, generally corresponding to the height of the so-called air spring. The height here corresponds to a distance in a vertical direction, as illustrated e.g. in FIG. 2. The height of the suspension arrangement (air spring) is determined on the basis of the load on the suspension arrangement and adjusted on the basis of a desired height and/or desired height adjustment. The control unit 200 may also be configured to determine aging of the flexible bellows as will be described below.

Figure 2:
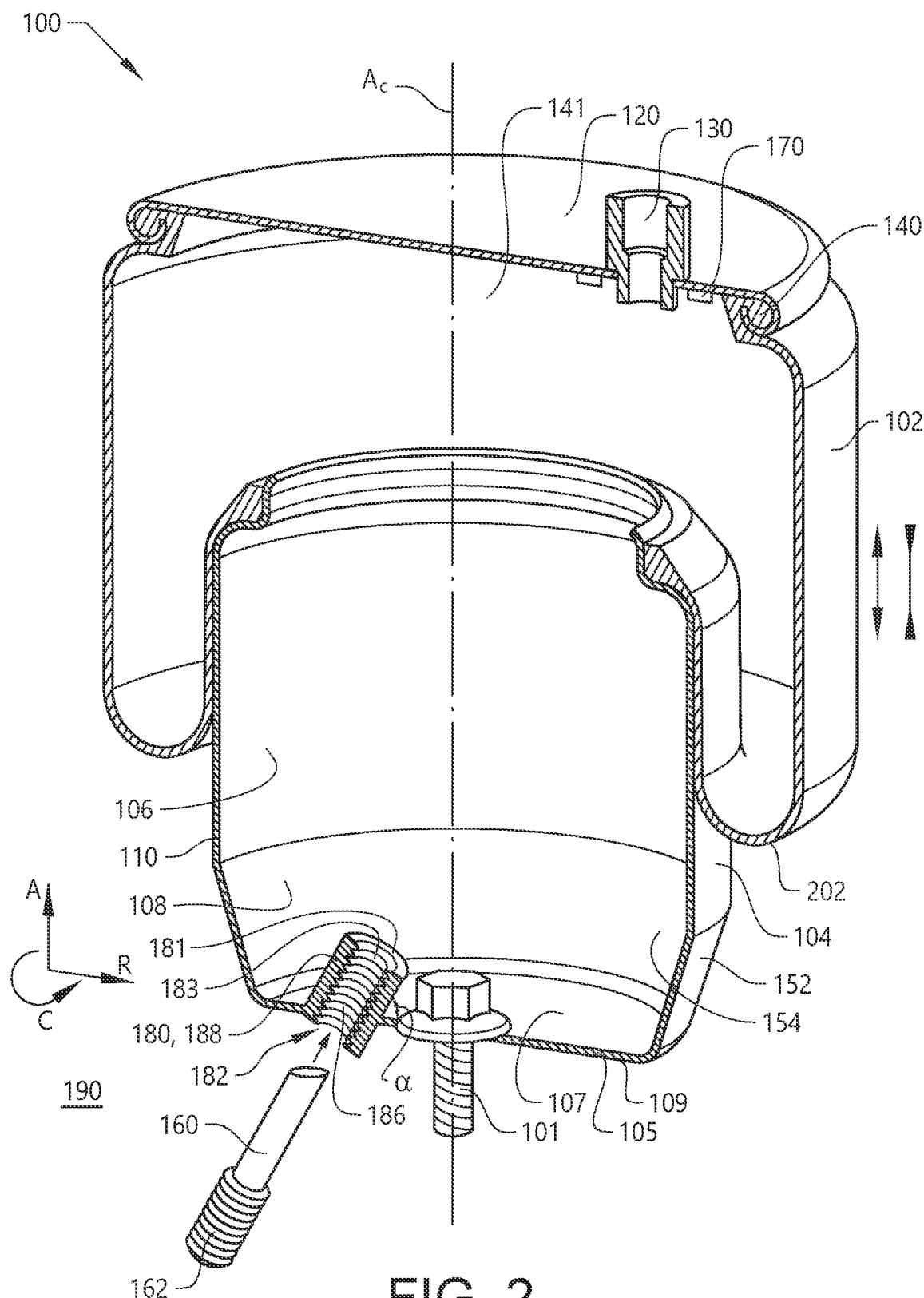
FIG. 2 is cut-out view of a suspension arrangement and flexible bellows according to an example embodiment.

In order to describe the vehicle suspension arrangement 100, and in particular the flexible bellows assembly 102 in further detail, reference is made to FIG. 2. The flexible bellows 102 may correspond to a new and unused flexible bellows or a flexible bellows that has been used for a certain period of time.

Figure 3A:
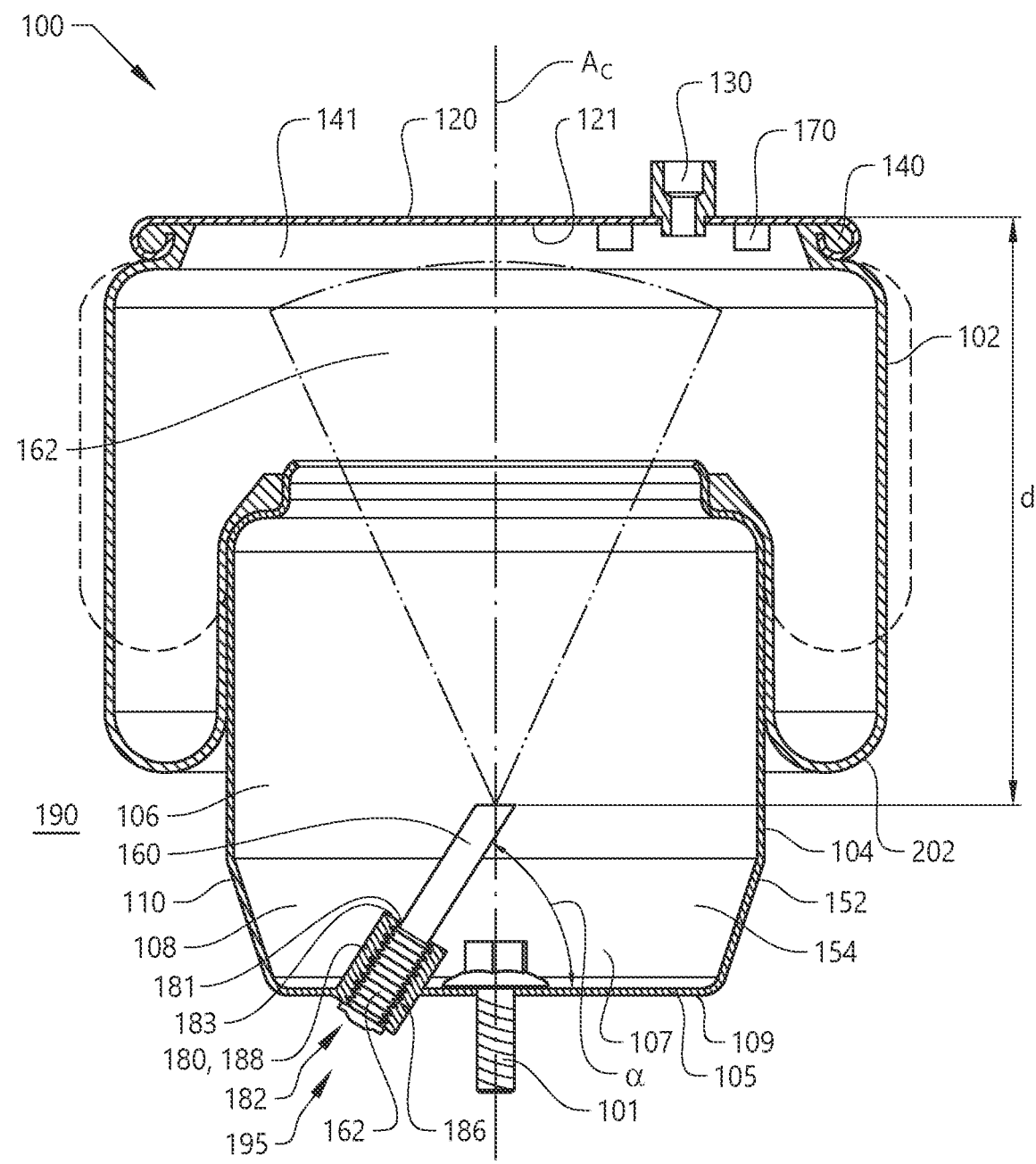
FIGS. 3A to 3D schematically illustrates a number of different mounting structures for positioning a sensor device in a piston of the suspension arrangement according to various example embodiments.
Figure 3B:
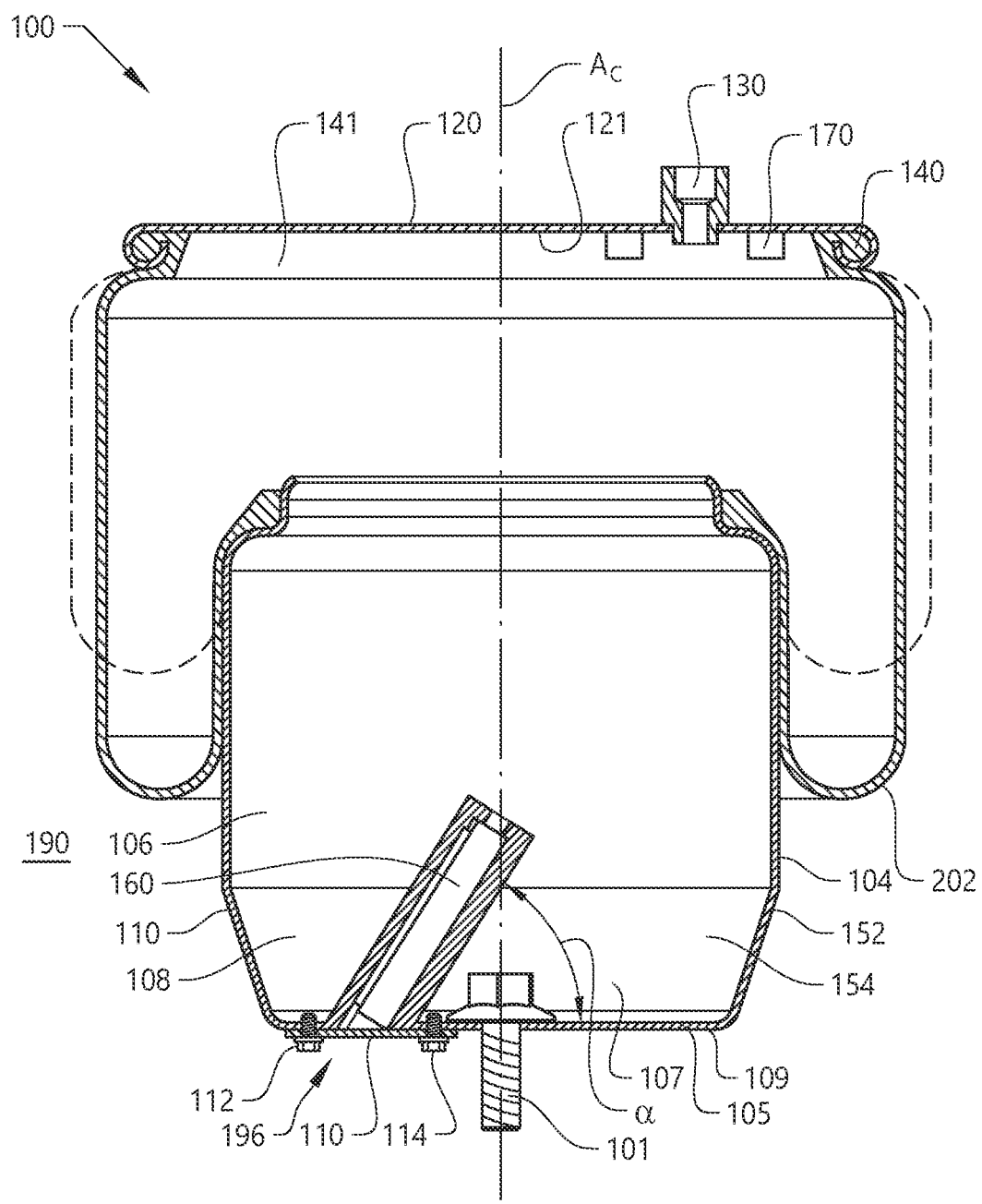
Figure 3C:
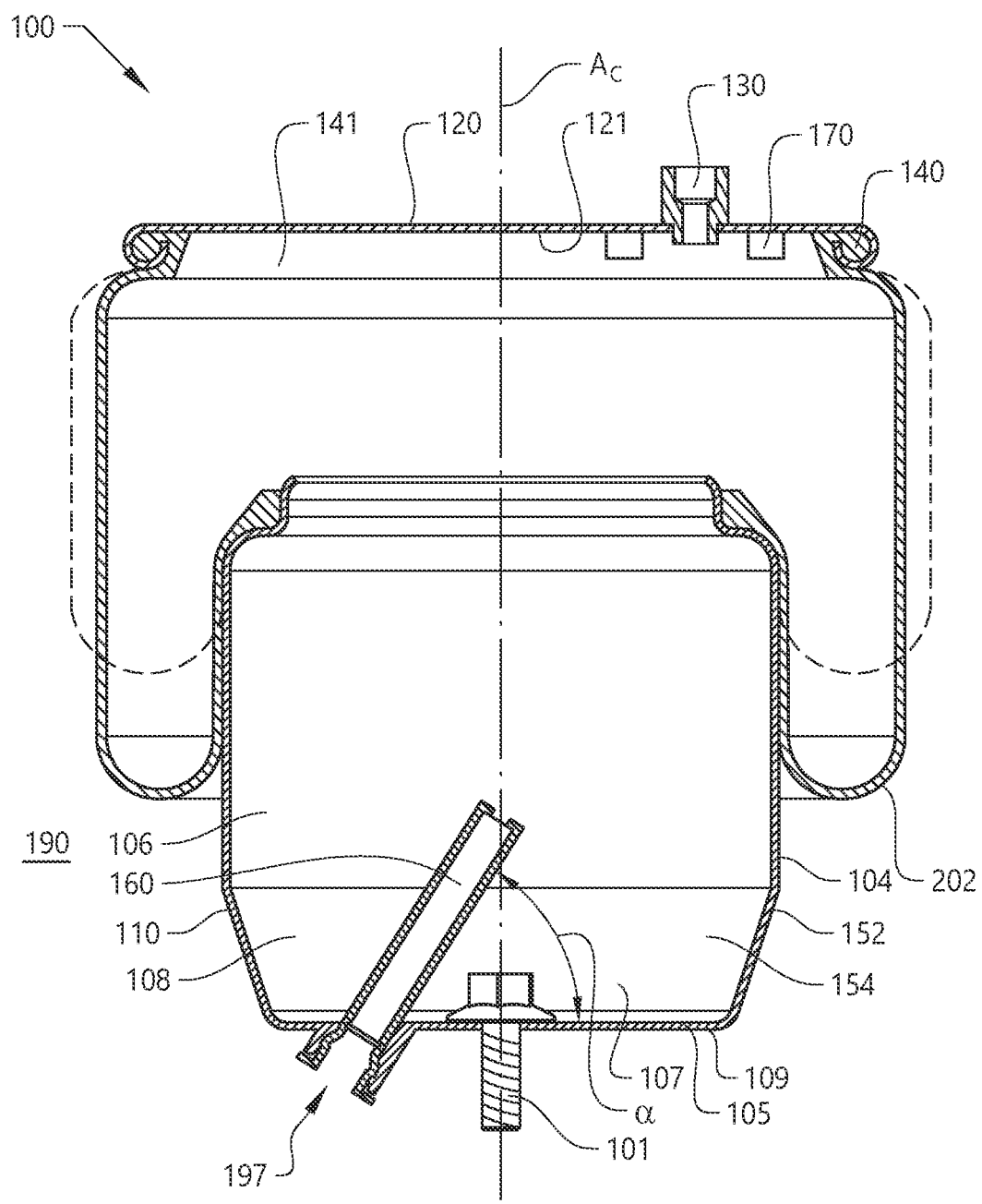
Figure 3D:
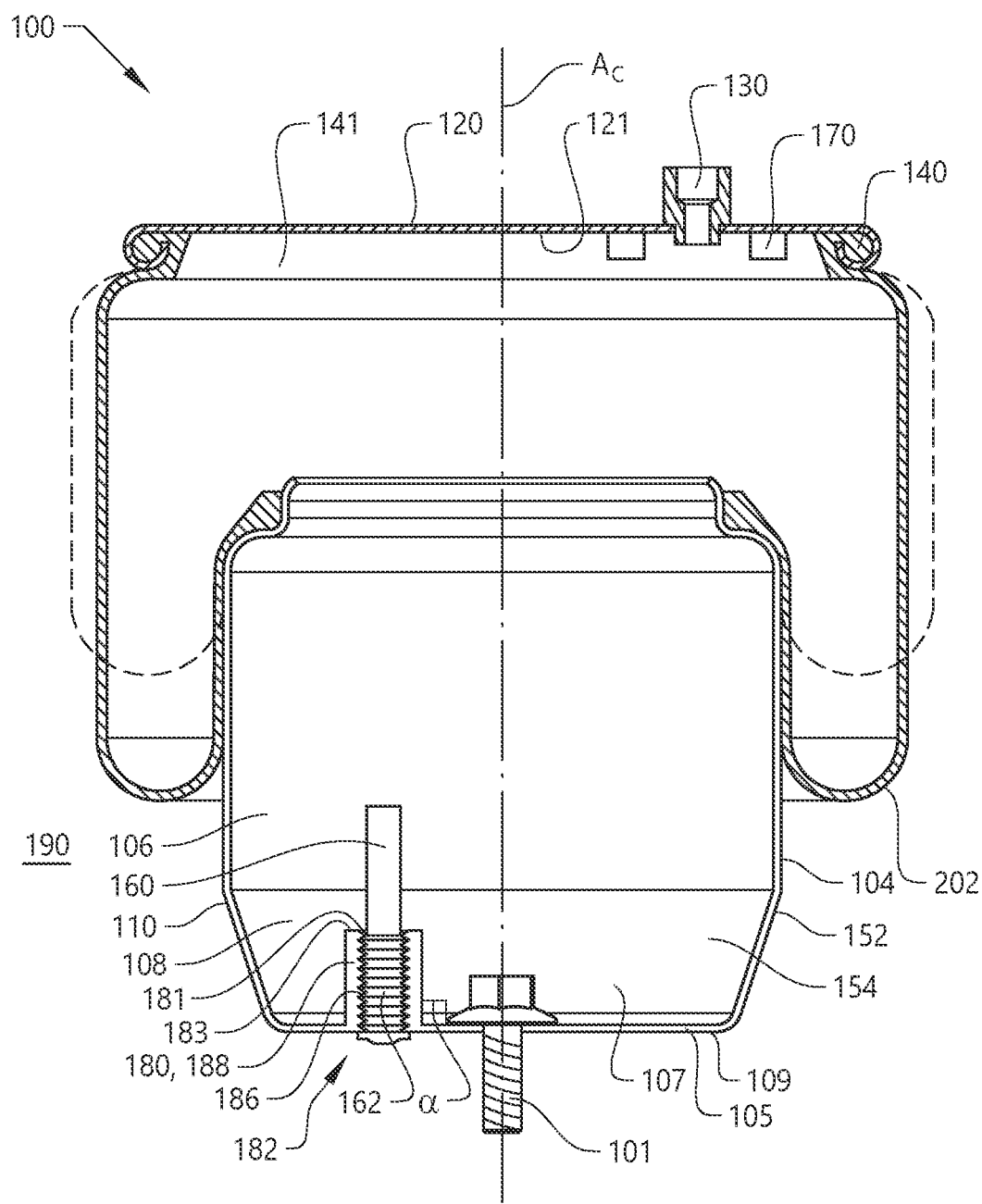

In the present disclosure, and as illustrated in the FIGS. 2 to 3D. the vehicle suspension arrangement 100 extends in the vertical direction generally corresponding to an axial direction A of the components making up the suspension arrangement 100. In addition, the suspension arrangement 100 and the components making up the suspension arrangement 100 generally extends in a radial direction R. Hence, "radial" or "radially" refer to a direction extending radially relative to an axis, typically a central axis extending in the axial direction A of the suspension arrangement and/or component. Further, the terms "circumference", "circumferential", or "circumferentially" refer to a circumference or a circumferential direction relative to an axis, typically the central axis extending in the axial direction A of the suspension arrangement and/or component. When the vehicle suspension arrangement 100 is arranged in the vehicle in FIG. 1, the axial direction A typically corresponds to the vertical direction of the vehicle, while the radial direction R may correspond to the transverse direction and/or the longitudinal direction.

Hence, the suspension arrangement 100 is herein described in an essentially upright orientation in the vehicle 1, which also corresponds to the ordinary implementation of the suspension arrangement in the vehicle 1. However, the suspension arrangement may in some vehicles be arranged in a slightly different orientation. As indicated in e.g. FIG. ", the suspension arrangement 100 and its components has an extension in the axial direction A, an extension in the radial direction R and an extension in the circumferential direction C.

It should be noted that the terms top, above, upper, upward, below, lower, downward and bottom, as well as any other similar terms are used in reference to the position of the suspension arrangement 100 and/or the components as depicted in the drawings and the suspension arrangement may be positioned and used in other orientations. In other words, also terms such as vertical, inner, interior, inside, outside, outer, exterior, side, and any other similar terms refers to the directions and orientations as depicted in the drawings and the suspension arrangement 100 and/or the components may be positioned and used in other orientations.

As can be seen in FIG. 2, the vehicle suspension arrangement 100 further comprises a piston 104. The piston is arranged and configured to support the flexible bellows assembly 102. The piston 104 is here made of a composite material, as is commonly known in the field. Further, the piston 104 comprises an outer side 152 and an inner side 154. The piston 104 thus at least partly defines an internal volume, as depicted in FIG. 2. Also, the piston 104 has an essentially circular cross-sectional shape, as seen along a cross section defined by the radial and axial directions R, A.

The outer side 152 refers to any one of the outer surfaces of the piston as illustrated in FIG. 2. The outer side 152 is here arranged to face away from the piston 104. The inner side 154 refers to any one of the inner surfaces of the piston as illustrated in FIG. 2. The inner side 152 is arranged toward the inner volume of the piston 104.

Turning again to FIG. 2, the piston 102 comprises a lower portion 105 which is connected to one of the wheel axles 3, 4 (FIG. 1). The lower portion 105 is a bottom portion of the piston. The lower portion 105 of the piston 104 may either be directly connected to the wheel axle 3, 4 by means of a suitable fixation arrangement, such as a bolt 101, or indirectly connected to the wheel axle 3, 4 via, for example, a bracket or the like (not shown). In the example embodiment depicted in FIG. 2, the piston 104 has a first, cylindrical portion 106 and a second portion 108 arranged below the first portion 106. The first portion 106 is connected to the flexible bellows assembly 102 and the second portion 108 is connected to one of the wheel axles 3, 4.

According to the example embodiment depicted in FIG. 2, the second portion 108 may be arranged in a tapered shape configuration, whereby the diameter of the second portion 108 is continuously reduced as seen in a direction from the first portion 106 towards the lower portion 105 of the piston 104. The first 106 and second 108 portions are divided by means of a notch 110 separating the first 106 and second 108 portions from each other. The second portion 108 should however not be construed as limited to the depicted taper shaped surface. The second portion 108 may equally as well take other shapes, such as concave shape or an indentations, etc. However, the shape of the second portion may advantageously differ from the cylindrical shape of the first portion a below the notch 110.

Generally, the bottom portion 105 of the piston 104 is a bottom portion of the second portion 108, as illustrated in FIG. 2. The bottom portion 105 comprises an inner bottom surface 107 and an outer bottom surface 109. Hence, the piston 104 comprises the inner bottom surface 107 and the outer bottom surface 109. The inner bottom surface 107 of the bottom portion 105 of the piston is part of the inner side 154 of the piston. Hence, the inner bottom surface 107 is the inner side of the bottom portion of the piston. The outer bottom surface 109 of the bottom portion 105 of the piston is part of the outer side 152 of the piston. Hence, the outer bottom surface 109 (or the outer side bottom surface) is the outer side of the bottom portion of the piston. The outer side bottom surface 109 of the bottom portion of the piston is generally the side that is can be easily accessible by service personnel during mounting and dismounting of the sensor device from the piston.

As further depicted in FIG. 2, the flexible bellows assembly 102 comprises an upper portion 140 having an open structure 141. A plate structure 120, or the like, is connected to the upper portion 140 of the flexible bellows for providing an enclosed spaced within the flexible bellows 102. The plate structure 120 may either be directly connected to the frame 2 of the vehicle 1 via a suitable fixation arrangement (not shown), or indirectly connected to the frame 2 via, for example, a bracket or the like (not shown). The upper plate structure 120 comprises an inner surface 121. In particular, the upper plate structure 120 for enclosing the upper portion 140 defines the open top structure 141 of the flexible bellows assembly 102.

The flexible bellows 102 is the movable portion of the vehicle suspension arrangement 100. The flexible bellows 102 is e.g. made of a rubber material to be able to move up/down on the first 106 and second 108 portions of the piston 104, i.e. the flexible bellows is "rolling" on the surface of the piston 104. Hence, when inflating gas, e.g. in the form of air into the flexible bellows 102 via a gas inlet 130, the plate structure 120 is moved in a direction away from the piston 104 such that the frame 2 is raised in relation to the wheel axle 3, 4. Likewise, when air is deflated from the flexible bellows 102, the plate structure 120 is moved in a direction towards the piston 104 such that the frame 2 is lowered in relation to the wheel axle 3, 4. To this end, the suspension arrangement 100 here includes the gaseous fluid medium inlet 130 for supplying a gaseous fluid medium into the flexible bellow assembly. Moreover, a portion of the flexible bellows 102 is arranged in contact with the piston 104. In particular, a portion of the flexible bellows 102 is arranged in contact with the first, cylindrical portion 106 of the piston 104. A portion of the flexible bellows 102 is also arranged in contact with the second portion 108 of the piston if a sufficient amount of external load in the form of a compression force F is compressing the flexible bellows 102. Hereby, a rolling lobe 202 of the flexible bellows 102 is rolling up and down on the surface of the piston 104 when the flexible bellows is exposed to cyclic and dynamic loads during operation of the vehicle 1.

As is further depicted in FIG. 2, in conjunction with FIG. 3A, the suspension arrangement 100 comprises a level indicator device 160. The level indicator device is here one example of a sensor device. In order to position the level indicator device 160 toward the flexible bellows assembly 102, the suspension arrangement 100 comprises a mounting structure 180, as depicted in FIG. 2 in conjunction with e.g. FIG. 3A. FIG. 2 illustrates the level indicator device 160 in a state prior to positioning it into the mounting structure 180, while FIG. 3A illustrates the level indicator device 160 being securely positioned into the mounting structure 180. In this position, the level indicator device is capable of transmitting a signal toward the flexible bellows assembly 102. A number of examples of various arrangements of the level indicator device 160 and the mounting structure 180 will be described in relation to FIGS. 2 and 3A to 3D.

When the level indicator device 160 is positioned in or to the mounting structure, e.g. as shown in FIG. 3A, the level indicator device 160 is arranged and configured to determine a distance moved by the flexible bellows 102 during operation thereof. Further, the level indicator 160 is typically connected to the control unit 200 (FIG. 1) for further processing of the data and signals from the measurements. In particular, the level indicator device 160 is configured to determine a distance moved by a portion of the flexible bellows assembly. As illustrated in FIG. 3A, the level indicator device 160 is configured and further arranged to transmit a signal towards the inner surface 121 of the upper plate structure 120 of the flexible bellows assembly 102. The level indicator device may e.g. be an optical sensor, a lidar sensor, an ultrasonic sensor, an IR-sensor and the like. Such types of level indicator devices are configured to transmit signals and receive reflected signals to determine the distance, as described herein.

As depicted in FIG. 2, and also FIG. 3A, the mounting structure 180 extends at least from the outer side 152 to the inner side 151. In addition, the mounting structure 180 comprises an outer opening 182 for receiving the insertable level indicator device 160 from an outside 190 of the piston 104. The mounting structure 180 is here a hollow housing 188. The hollow housing comprises the outer opening 182 arranged at a bottom part of the mounting structure 180. The outer opening should be designed in relation to the type and size of the device 160. The mounting structure 180 here also has an opposite opening 181 for permitting signals from the level indicator device 160 to be transmitted towards the flexible bellows assembly 102. The opening 181 is arranged to face toward the upper part of the piston, as illustrated in FIGS. 2 and 3A. Hence, the opening 181 faces toward the upper inner surface 121 of the flexible bellows assembly. The hollow housing can be designed in different ways and may generally be made in a composite material, plastic material or a metallic material. The hollow housing 188 comprises an inner circumferential side wall 183, as depicted in FIGS. 2 and 3A.

Moreover, the mounting structure 180 is here arranged offset a centre of the inner bottom surface 107 of the piston 102. In other example embodiments (not shown), the mounting structure 180 may be arranged at the centre of the inner bottom surface 107 of the piston 102. In such examples, the bolt 101 may be arranged at another location on the lower part 105 of the piston.

It should be noted that the mounting structure 180 may either be an integral part of the piston 104, as illustrated in FIGS. 2 and 3A, or a separate part attached to the piston 104. For designs of the piston 104 when the mounting structure 180 is an integral part of the piston, the mounting structure 180 is moulded into the piston 104. By way of example, the piston 104 is in a composite material. Hence, the mounting structure 180 is made of a composite material.

When the mounting structure 180 is a separate part, the mounting structure is a separate part of the suspension arrangement 100 and part of the mounting structure 180 is arranged on any one of the inner side and outer side of the piston 102. By way of example, a part of the mounting structure is attached to the inner bottom surface 107 of the piston 104. In such example, the mounting structure can be made of a metal or a composite material.

As mentioned above, the mounting structure 180 is further arranged and configured to position the level indicator device 160 toward the flexible bellows assembly 102. The positioning of the level indicator device 160 in or to the mounting structure 180 can be provided in several different ways, as will now be further exemplified by and described in relation to FIGS. 2 and 3A to 3D.

FIG. 3A schematically illustrates one example embodiment of a mounting structure 180 for positioning the level indicator device 160 in FIG. 2 toward the flexible bellows assembly 102. FIG. 3A is a cross-sectional view of the piston including the mounting structure 180 and the level indicator device 160. The mounting structure 180 as illustrated in FIGS. 2 and 3A provides for positioning level indicator device 160 in an angled orientation relative to the bottom surface 107 of the of the second portion 108 of the piston 104. As such, the mounting structure 180 is configured to arrange the accommodated level indicator device 160 in an angled orientation relative to the bottom surface 107 of the of the second portion of the piston 104.

As depicted in FIG. 3A, the hollow housing 188 of the mounting structure 180 is configured to accommodate the level indicator device 160 such that the level indicator device 160 is positioned toward the flexible bellows assembly 102. In addition, the housing 188 here comprises an inner circumferential side wall 183 that is inclined in relation to the inner bottom surface 107 of the piston 104. In this manner, the mounting structure 180 is configured to arrange the accommodated device 160 in the angled orientation relative to the bottom surface 107 of the of the second portion.

By way of example, the mounting structure 180 is configured to arrange the sensor device 160 in an angled orientation relative to the bottom surface 107 by an angle α of between 5 to 85 degrees. The angle and inclination may generally be defined by the inclination of the inner circumferential side wall 183, the arrangement/attachment inclination of the mounting structure 180 to the piston 104 and/or a combination thereof.

Turning again to the positioning and attachment of the level indicator device 160 to the mounting structure 180, FIG. 2 in combination with FIG. 3A illustrates one example of an intuitive positioning of the device 160 to the hollow housing 188 of the mounting structure 180. In FIGS. 2 and 3A, the level indicator device 160 is arranged in the mounting structure by means of a rotational lock configuration 195. By way of example, the mounting structure 180 comprises a rotational lock component 186. The mounting structure rotational lock component 186 comprises an internal thread. Analogously, the level indicator device 160 comprises a corresponding outer thread forming a corresponding rotational lock component 162. As illustrated by FIGS. 2 and 3A, the internal thread of the rotational lock component 162 engages with the outer thread of the rotational lock component 186 when rotationally inserting the level indicator device 160 into the hollow housing 188 of the mounting structure 180. Hereby, the rotational lock configuration 195 is obtained via rotational lock component 162 of the level indicator device 160 and rotational lock component 186 of the mounting structure 180, and the level indicator device is accurately positioned in the mounting structure, as illustrated in FIG. 3A. The threaded parts of the device 160 and the mounting structure 180 may extend over a substantial part, as shown in FIG. 2, but not necessarily over the entire length of the components.

The arrangement and positioning of the level indicator device 160 to the mounting structure can be provided in other ways, as exemplified by the design in FIG. 3B to 3D. Each one of these example embodiments may be used in the suspension arrangement 100 as described above, and may also include any feature and/or component as described in relation to FIGS. 1, 2 and 3A.

FIG. 3B schematically illustrates another example embodiment of a mounting structure 180 for positioning the level indicator device 160 toward the flexible bellows assembly 102. FIG. 3B is a cross-sectional view of the piston including the mounting structure 180 and the level indicator device 160. As illustrated in FIG. 3B, the mounting structure 180 is here configured to position the level indicator device 160 inside the mounting structure by a mechanical fastener lock configuration 196. The fasten lock configuration can be provided in several different manners. By way of example, the mechanical fastener lock configuration 196 is a conventional screw connection comprising lock bolts 112, 114 and a washer 116. A washer is a conventional machine component that is used in conjunction with a screw fastener such as a bolt and nut and that serves to distribute the load from the bolt head over an area of the device 160 so that the device 160 is held in its intended position inside the hollow housing 188 of the mounting structure 180. In other examples (although not shown), the mechanical fastener lock configuration comprises a retaining ring/lock ring, a lock pin or the like.

FIG. 3C schematically illustrates another example embodiment of a mounting structure 180 for positioning the level indicator device 160 toward the flexible bellows assembly 102. FIG. 3C is cross-sectional view of the piston 104 including the mounting structure 180 and the level indicator device 160. As illustrated in FIG. 3C, the mounting structure 180 is here configured to position the level indicator device 160 inside the mounting structure by a snap lock configuration 197. The snap lock configuration 197 can be provided in a conventional manner, and thus not further described herein.

In other example embodiments (although not illustrated), the mounting structure 180 is configured to position the sensor device 160 by any one of a friction lock configuration and a magnetic lock configuration. In other words, the disclosure provides a number of different ways to position and arranged the sensor device 160 in or to the mounting structure 180 so as to permit the sensor 160 to transmit and receive signals within the inner volume of the piston 104.

It may also be possible to arrange and position the level indicator device 160 in another orientation in relation to the bottom surface 107 of the piston 104. FIG. 3D schematically illustrates one example embodiment of a mounting structure 180 for positioning the level indicator device 160 toward the flexible bellows assembly 102. FIG. 3D is cross-sectional view of the piston 104 including the mounting structure 180 and the level indicator device 160. In this example embodiment, the mounting structure 180 is configured to arrange the accommodated level indicator device 160 in a perpendicular orientation relative to the bottom surface 107 of the of the second portion 108 of the piston 104.

In all of the above example embodiments, the level indicator device 160 is detachably arranged to the mounting structure 180. In addition, the level indicator device 160 is insertable into to the mounting structure 180 from the outside 190 of the piston 104.

As mentioned above, the level indicator device 160 is provided for measuring a level, i.e. a distance d between the level indicator device 160 and a part of the suspension arrangement, e.g. the flexible bellows. The distance d may generally refer to a vertical distance, as depicted in FIG. 3A. The flexible bellows 102 is generally exposed to a compression force F resulting in a specific distance of compression of the flexible bellow 102. The vertical distance refers to a vertical distance moved by the portion, i.e. the rolling lobe when the flexible bellows 102 is exposed to the external compression force F.

The determined distance d can be used by the control unit 200 for further processing. In particular, the determined distance d is used for controlling and regulating the vertical height of the suspension arrangement, as mentioned above. It may also be used for comparison with a reference value in order to monitor and detect any degradation (aging) of the flexible bellows 102.

In addition, or alternatively, the flexible bellows may be inflated with air for lifting the chassis relative to the wheel axles. Hereby, the distance, preferably the vertical distance, moved by the frame is detected. From this determined distance, it may also be possible to detect and determine the amount of air inflated into the flexible bellow by means of the control unit 200 according to conventional methods.

Accordingly, and as depicted in FIG. 2, the suspension arrangement 100 here also comprises a gas pressure sensor 170 arranged inside the flexible bellows for measuring the gas pressure level within the flexible bellows 102. The gas pressure sensor 170 is typically connected to the control unit 200.

Accordingly, to sum up, the suspension arrangement 100 comprises the piston 104 for supporting the flexible bellows assembly 102 of the suspension arrangement. The piston is provided with the first portion 106 connected to the flexible bellows assembly and the second portion 108 connected to one of the wheel axles 3, 4.

The piston 104 further comprising the outer side 152 and the inner side 154.

Moreover, the suspension arrangement 100 further comprises the mounting structure 180 for positioning the insertable sensor device 160 toward the flexible bellows assembly 102. The mounting structure extends at least from the outer side 152 to the inner side 151. In addition, the mounting structure comprises the outer opening 182 for receiving the insertable sensor device from an outside of the piston.

It is to be understood that the present disclosure is not limited to the embodiments described above and illustrated in the drawings; rather, the skilled person will recognize that many changes and modifications may be made within the scope of the appended claims.

The invention claimed is:

1. A suspension arrangement for a vehicle, comprising a piston for supporting a flexible bellows assembly of the suspension arrangement, said piston having an outer side and an inner side, said piston further having a first portion connectable to the flexible bellows assembly and a second portion connectable to a wheel axle, wherein said suspension arrangement further comprises a mounting structure for positioning a sensor device toward the flexible bellows assembly, said mounting structure extending at least from the outer side to the inner side and having an outer opening for receiving the sensor device from an outside of the piston.

2. The suspension arrangement according to claim 1, wherein said mounting structure is configured to arrange the accommodated sensor device in an angled orientation relative to a bottom surface of the of the second portion of the piston.

3. The suspension arrangement according to claim 2, wherein the mounting structure is a hollow housing for accommodating the sensor device, said housing having an inner circumferential side wall inclined in relation to the bottom surface.

4. The suspension arrangement according to claim 2, wherein the mounting structure is configured to arrange the sensor device in an angled orientation relative to the bottom surface by an angle of between 5 to 85 degrees.

5. The suspension arrangement according to claim 1, wherein said mounting structure is configured to arrange the accommodated sensor device in a perpendicular orientation relative to a bottom surface of the of the second portion of the piston.

6. The suspension arrangement according to claim 1, wherein the mounting structure is arranged offset a centre of the inner bottom surface of the piston.

7. The suspension arrangement according to claim 1, wherein the mounting structure is an integral part of the piston.

8. The suspension arrangement according to claim 1, wherein the mounting structure is a separate part, and wherein a part of the mounting structure is arranged on any one of the inner side and outer side of the piston.

9. The suspension arrangement according to claim 1, wherein the mounting structure comprises a rotational lock component for engaging with a corresponding rotational lock component of the sensor device so as to form a rotational lock configuration.

10. The suspension arrangement according to claim 1, wherein the mounting structure is configured to position the sensor device by any one of a friction lock configuration, mechanical fastener lock configuration, snap lock configuration and a magnetic lock configuration.

11. The suspension arrangement according to claim 1, further comprising the flexible bellows assembly for damping motions from the wheel axle; said flexible bellows assembly being at least partially connected to the first portion of the piston and further arranged to move relative to the first portion when the suspension arrangement is exposed to an external load.

12. The suspension arrangement according to claim 1, further comprising a sensor device in the form of a level indicator device configured to determine a distance moved by a portion of the flexible bellows assembly.

13. A vehicle comprising a suspension arrangement according to claim 1, wherein said suspension is arranged between a frame and a wheel axle of the vehicle.

* * * * *